Sept. 17, 1940.   H. E. WEIHMILLER   2,214,945
RETRACTABLE HYDROVANE
Filed July 31, 1937
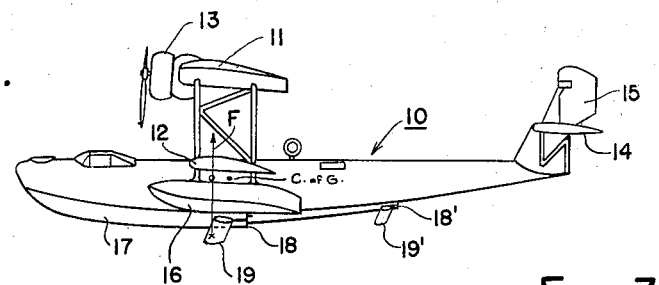
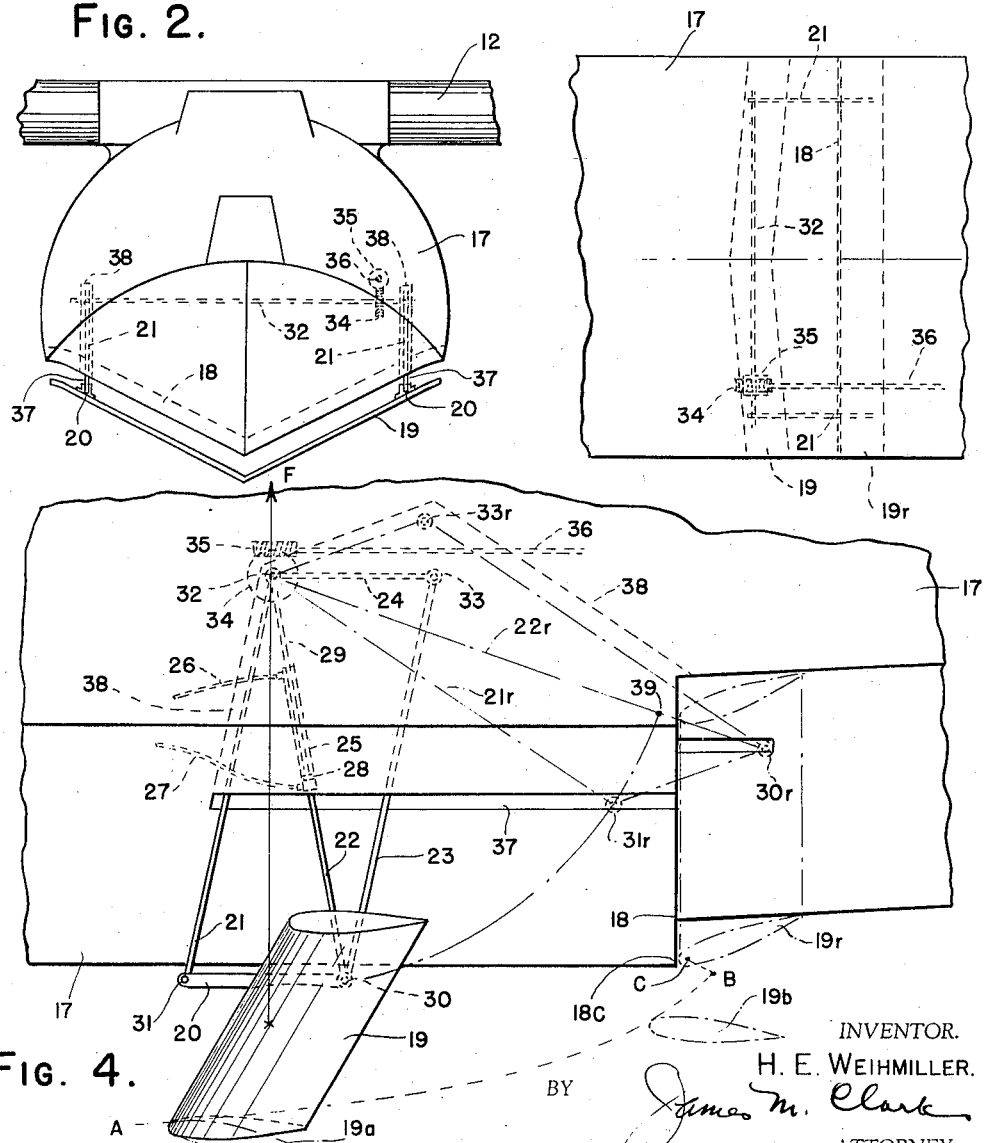
INVENTOR.
H. E. WEIHMILLER.
BY James M. Clark
ATTORNEY.

Patented Sept. 17, 1940

2,214,945

UNITED STATES PATENT OFFICE 2,214,945

RETRACTABLE HYDROVANE

Horace E. Weihmiller, Washington, D. C., assignor to Consolidated Aircraft Corporation, a corporation of Delaware Application July 31, 1937, Serial No. 156,661

13 Claims. (Cl. 244—102)

My invention relates to flying boat of hydroairplane construction, and is particularly directed to hydrovanes or hydrofoils and the aerodynamic fairing of the steps in hulls or floats of such aircraft.

The parasitic drag of an aircraft structure is the sum of two kinds of air resistance, i. e., skin friction or viscous resistance, and turbulence or eddy-forming resistance. Turbulence develops wherever there is a breakdown in the smooth streamline flow of fluid, causing eddying disturbances in the fluid as it moves by the body. Pure skin resistance seldom exists alone and even in the best of streamline shapes turbulence is present and contributes the greater part of the drag, because the flow of a real fluid by a solid body can never be truly laminar, as even the slightest variation from parallelism in the streamline tends to induce a transference to turbulent flow. In view of the fact that the degree of the resulting turbulence is in some direct proportion to the acuteness of the variation from parallelism in the immersed body, then it is readily recognized that variations such as projections or cavities in a surface are the direct cause of turbulence. This is especially true in flying boat hulls where the smooth hull surface is abruptly interrupted at the step, or steps, and it has been known for some time that therein lay the cause of much turbulence and its resultant parasitic drag. Such aerodynamic inefficiency had to be tolerated for the sake of the peculiar hydrodynamic properties of the steps which are necessary to get the craft off the surface of the water but thereafter are a source of undesirable drag.

The invention hereinafter described has for its principal object the substantial reduction of the aerodynamic drag of the stepped construction of floats or hulls by the retraction thereagainst of hydrofoil members.

Another object is to produce a hydrofoil useful to assist the aircraft in taking off from the surface of the water which hydrofoil will be retractable to a "flying" position wherein it will fair a hydroplane step and be itself faired thereby. A still further object is the provision of means of adjusting the angle of incidence of the hydrovane and of ensuring a snug meeting of the vane and step.

These and other objects will be readily apparent from the following description and drawing wherein:

Fig. 1 shows a side elevation of a flying-boat equipped with auxiliary hydrovanes capable of being retracted to fair the hull steps, Fig. 2 is an enlarged front view of a fuselage with a hydrovane extended.

Fig. 3 is a plan view of Fig. 2 showing in dotted lines both the extended and retracted positions of the hydrovanes; and Fig. 4 is a still further enlarged side view illustrating various relative positions of the hydrovane with respect to the step.

A flying-boat 10 equipped with conventional wings 11 and 12, power plants 13, stabilizers 14, rudder 15, outboard stabilizing floats 16 and having a boat-shaped fuselage 17 incorporating one or more steps 18 and 18', by means of which the craft is adapted to take off from or to alight upon the surface of water, is provided with V-shaped hydrofoils, 19 and 19', each formed with a rearward sweep or rake and other identical characteristics. Near the outer extremities of the V-shaped hydrovane 19 are rigidly affixed cantilever arms 20 which at their forward ends terminate in pivots 31 to which are joined the upright struts 21 extending upwardly through longitudinal slots 37, in hull 17, into a watertight well 38 in which they are pivoted on the crossshaft 32. The opposite ends of the arms 20 are also fitted with pivots 30 at which are attached the vertically divergent struts 22 and 23. The latter strut extends to a pivotal connection 33 with the normally horizontal strut 24, which at its other extremity is pivotally mounted on the cross-shaft 32. Thus the members 20, 21, 23 and 24 form a pivoted parallelogram of which the member 20 is affixed to maintain an unchangeable relation to the hydrovane 19. Extending diagonally across the above described parallelogram is a fifth extensible strut member composed of three main elements; namely a strut 22 pivoted at 30 to the hydrovane 19, a fluid-actuated cylinder 25 carried on the upper end of strut 22 and lastly a piston strut 29 telescoping within the cylinder 25 and at its opposite end being splined or otherwise suitably fixed to the cross shaft 32, which is suitably journalled within the boat hull 17 at a certain location with respect to the step 18.

Also mounted on shaft 32, so as to cause rotation thereof, is a gear 34 meshing with a helical or worm gear 35 on the shaft 36 and it is contemplated that the shaft 36 extend to the pilot's control position to be terminated in a suitable means, such as a hand crank, for imparting rotation thereto. When more than one hydrovane 19 is employed, as indicated in Fig. 1, where two are used, then either separate shafts 36 may be supplied for the regulation of each individually, or they may be operated in unison from a single shaft.

Thus it is apparent that upon rotation of shaft 36, its motion is imparted to the shaft 32 through the agency of the gears 34 and 35, and this motion being still rotational has a turning effect upon the parallelogram 20, 21, 23, 24, etc., which causes the hydrovane 19 to pivot with respect to hull 17. If the vane were in the fully extended position then such motion would retract it rearwardly and upwardly toward the adjacent step 18. Specifically the point 30 would traverse the arcuate line shown in Fig. 4 to finally arrive at a point 39, if it were possible for the hydrovane 19 to be so rotated without interference by the lower portion 18c of the step 18. However, as was previously stated, the strut 22, 25, 29 is extensible, that is the cylinder 25 contains a piston 28 adapted to have either of its faces placed under fluid pressure selectively transmissable through the conduits 26 or 27 either under manual control of the pilot or through automatic means affected by the retracting movement of the hydrovane 19 or its mechanism. Such means being well known in the art and not forming a part of this invention, are therefore not shown or described in detail.

Thus the hydrovane 19 can be retracted rearwardly with a concomitant lengthening of the strut 22, 29; the result being that the vane 19 is tilted from its previous attitude due to the collapsing of the parallelogram 20, 21, 23 and 24, which lengthens as it collapses. Hence the vane 19 is enabled to clear the step portion 18c having followed a curved path A—B along the dotted line whereon the vane is shown in an intermediate position 19b. Having arrived at the location B the strut 22, 29 can then be contracted sufficiently to draw the hydrovane 19 up into position C, snugly behind the step 18. In this terminal position C the hydrovane is indicated by 19r while the designations of the skeleton showing of the parallelogram 20, 21, 23 and 24 have the subscript r appended, the previously described point 39 being extended to the point indicated at 30r. In this retracted position the step 18 is faired by the hydrovane 19r and reversely the hydrovane is faired by the step. To extend the hydrovane 19 the sequence of events is exactly the reverse of that just detailed.

The practical value of hydrovanes in assisting the takeoff of seaplanes is well known but this value may be greatly lessened or even nullified if the hydrofoil is not properly positioned or if its planing angle is not correctly adjusted with respect to the hull. Preferably the resultant hydro-dynamic force R on the hydrovane 19 should pass through the pivot 32 and also through or at least close to the craft center of gravity at some planing angle of the hull. If multiple hydrovanes are used the resultant force R on the forward vane 19 should pass in front of the center of gravity as shown in Fig. 1. A feature of the present invention is the adjustability of the attitude of the vanes 19 or 19', as illustrated at 19a, merely by extending or contracting the strut 22, 29 by the means previously described, which has the effect of tilting it bodily about the pivot 30. Due to this adjustable characteristic, the center of pressure can be shifted on each vane 19 to obtain the optimum results and, additionally, such adjustability makes it possible to vary the planing angle of the hull 17 for best results.

While it has been inferred herein that hydraulic or fluid-actuated means would be used to extend or contract the extensible strut 22, 29, it is also within the purview of this disclosure to employ, instead of the hydraulic strut, 25, other mechanical substitutes operating on the principle of the lead screw. It is even held desirable to make use of electrical actuation in certain installations not only for varying the length of the extensible strut 22, 29 but also for swinging it in a longitudinal plane to retract the hydrovane 19 and in combination therewith it is proposed to employ indicating means of any suitable type located in the pilot's compartment to at all times show the relative attitude of the hydrovane in relation to the hull 17.

The present invention also contemplates that in addition to trimming the aircraft in the water by adjustment of the angle of incidence, or the fore and aft position of the hydrovane, that similar adjustments can also be made to trim the airplane while in the air. It is also considered within the scope of the present invention that the greater drag and suction of the hull when landing in the water with the hydrovane retracted against the step will reduce the tendency of "bouncing" or "skipping."

The purpose of this description has been to fully explain the preferred embodiment of this invention but it is obvious that many variants of the basic idea of an adjustable hydrovane capable of retraction to fair a hydroplane step can be made and it is intended that all such be covered hereby within the scope and extent of the appended claims.

What I claim is:

1. In a flying-boat, a stepped hull, hydrovanes, retracting mechanism for the said hydrovanes adapted for adjusting the center of pressure on the said hydrovanes comprising an arm fixed to said hydrovane, support members pivotally attached to the ends of said arm and to said stepped hull and extensible means organized to vary the angular disposition of said support members to said arm.

2. In an aircraft, an airfoil, and mounting means adapted to adjust the angular disposition of said airfoil comprising a strut pivotally attached to said airfoil and to said aircraft, a second strut also pivotally attached to said airfoil, a third strut pivotally joined to the free end of said second strut and to said first strut so as to form a parallelogram of said struts, the fourth side of which is formed by said airfoil, an extensible strut comprising a diagonal of said parallelogram adapted to vary the angular relationship of said struts and means for actuating said extensible strut.

3. In a flying-boat, a stepped hull, associated hydrovanes, support members adapted to adjust the angle of incidence of said hydrovanes each including a pivotally mounted, extensible strut, mechanism for swinging each of said hydrovanes to a position immediately in the rear of a step and means to actuate said extensible strut to retract the hydrovanes into the angle of said step.

4. In combination, stepped portions of a flying boat hull, an hydrofoil, sustaining means for said hydrofoil pivotally mounted in the vicinity of one of said stepped portions comprising systems of a plurality of strut members pivotally joined in the form of a parallelogram, said pivotal mounting for the parallelogram being located within the boat hull, means adapted to permit swinging of said hydrofoil and other means for varying the angular attitude of said hydrofoil whereby said stepped portions and said hydrofoil mutually co-act to reduce the aerodynamic drag of the said elements when the hydrofoil is positioned to lie in the angle of the step with said parallelogram wholely contained within said hull.

5. In combination with a stepped boat hull, an hydrofoil, retracting mechanism serving to mount the said hydrofoil for bodily movement with respect to said hull comprising a parallelogrammatic structure of pivotally joined struts, said structure being attached in pivoted relationship to the said hull and an exensible diagonal member associated with said structure for adjusting the attitude of the hydrofoil with respect to the hull.

6. In a flying boat, a stepped hull, hydrovanes associated therewith, mounting means for each said hydrovane adapted to bodily swing said hydrovane into fairing relationship with a stepped portion of said hull, an extensible element in said mounting means pivotally attached to said hull and to each said hydrovane adapted to change the angle of incidence of said hydrovane, and means to vary the length of said extensible element.

7. In combination with a V-bottom hydroplane provided with steps, associated hydrovanes of airfoil contour characterized by a substantially V-shape in which the arms thereof are formed with a rearward sweep from the entering edge, means pivotally mounting each of said hydrovanes on the hydroplane in the vicinity of a step, and dual retracting mechanism for each hydrovane comprising an extensible fluid-actuated and pivotally mounted strut assembly adapted to swing the hydrovane from an extended position into close affinity with said step whereby mutual fairing of the hydrovane and the step is accomplished.

8. In combination, a V-bottom hydroplane provided with steps, associated hydrovanes of airfoil contour, characterized by a substantially V-shape in which the arms thereof are formed with a rearward sweep in the direction of the trailing edge, pivot means for mounting each of said hydrovanes on the hydroplane in the vicinity of a step, retracting mechanism for each hydrovane comprising a pivotally joined strut assembly including an extensible member for varying the relative angular disposition of said hydrovane and means to swing said assembly whereby the hydrovane is positioned in close affinity with one of said steps for mutual fairing purposes.

9. In combination with a stepped V-bottom hydroplane, associated hydrovane of airfoil contour and corresponding V-shape, mounting means for each hydrovane comprising a parallelogrammatic arrangement of struts, an extensible member incorporated in said arrangement to cause deformation thereof for the purpose of changing the angle of incidence of said hydrovane and means to swing the hydrovane on its mounting to a position in close affinity with a stepped portion of said hydroplane for the purpose of reducing the aerodynamic drag of the combination.

10. In a boat hull, a transverse step, a hydrofoil associated therewith, means for retracting said hydrofoil to a position continguous to said step, said means comprising a parallelogrammatic assembly of struts extending through slots in the surface of said hull, journal means for mounting said assembly within the hull to permit bodily swinging movements of said assembly and means adapted to cause such movement.

11. In combination with a flying boat hull, associated hydrovanes, mechanism for adjusting the angle of incidence of each said hydrovane comprising an extensible strut pivotally attached to said hull and to said hydrovane, a second inextensible strut pivotally attached to said hull and said hydrovane and means to vary the length of said extensible strut.

12. In combination with a stepped hydroplane, associated hydrovanes of airfoil contour, mounting means for each such hydrovane comprising a parallelogrammatic arrangement of struts pivotally attached to said hydroplane and to said hydrovane and an extensible element of said parallelogrammatic arrangement of struts adapted to vary the angular disposition of said hydrovane by varying the relative arrangement of the struts.

13. In a boat hull, a transverse step, a hydrovane associated therewith, means for retracting said hydrovane into the angle of said step, said means comprising pivoted arrangements of struts forming parallelograms extending through slots in the surface of said hull to attach to said hydrovanes, journal means for mounting said parallelograms within said hull to permit bodily movement thereof in said slots, means to cause simultaneous rotation of said parallelograms about their journals, and means to deform said parallelograms to produce a relative angular displacement of said hydrovane.

HORACE E. WEIHMILLER.